(No Model.)
T. O'BRIEN.
WHEEL.
No. 388,907. Patented Sept. 4, 1888.
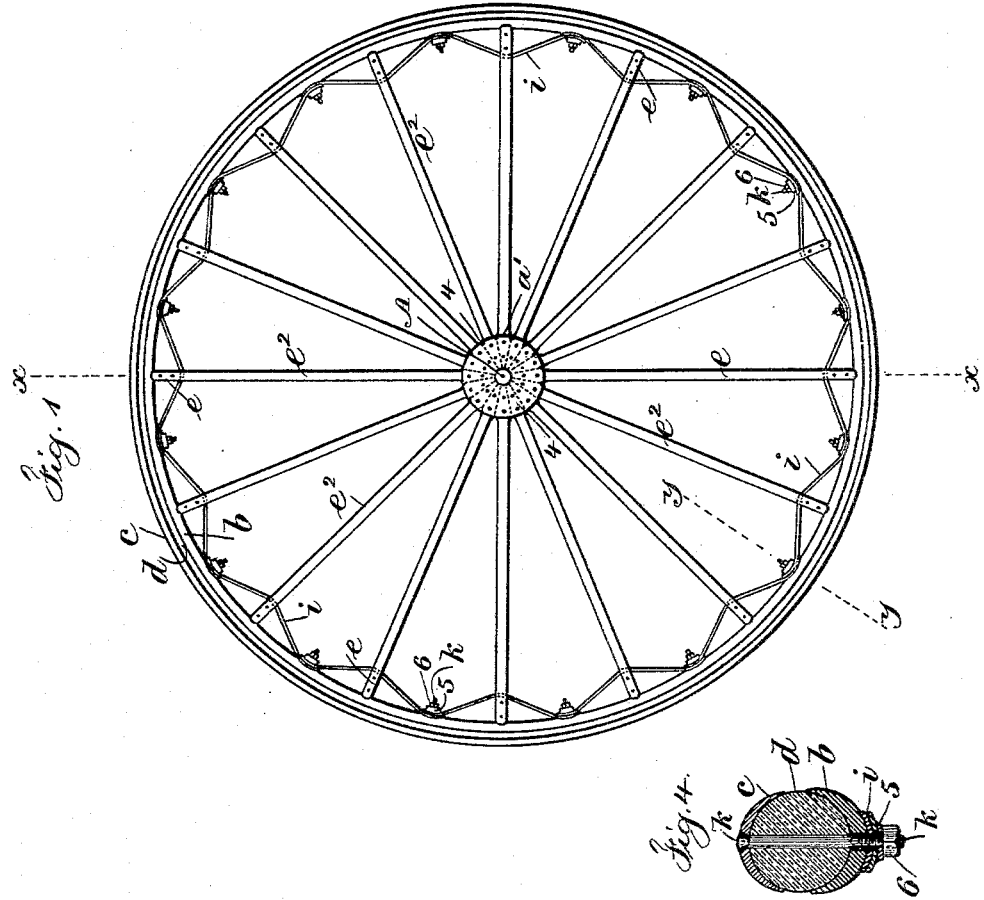
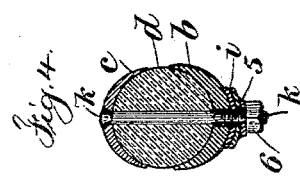
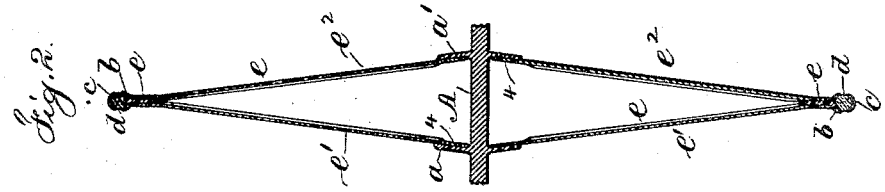
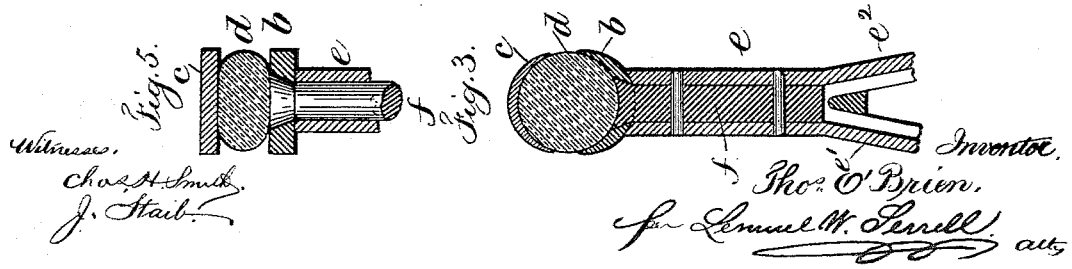

UNITED STATES PATENT OFFICE.

THOMAS O'BRIEN, OF NEW YORK, N. Y.

WHEEL.

SPECIFICATION forming part of Letters Patent No. 388,907, dated September 4, 1888.

Application filed October 21, 1887. Serial No. 252,990. (No model.)

*To all whom it may concern:*

Be it known that I, THOMAS O'BRIEN, of the city, county, and State of New York, have invented a new and useful Improvement in Wheels, of which the following is a full, clear, and exact description.

My invention relates especially to that class of wheels employed upon bicycles, tricycles, and other cycles, reaping and mowing machines, and other agricultural machinery, and the same is also applicable to carriages.

The wheels heretofore employed upon cycles and agricultural machines, whether with or without a rubber tire, have generally consisted of a flanged hub, a rim, and spokes of wire or rods connecting the flanges and rim, respectively.

In carrying out my invention I employ a rim and axle or hub with flanges, and I use a specially-constructed spoke connecting the flanges and rim, respectively. The spokes are double or companion spokes, and they are formed by splitting a given length of sheet-metal tube for all but about two inches of its length. The split end is spread into shape and its extreme ends flattened and riveted to the inner opposite faces of the hub-flanges. The outer tubular end of the double spoke receives a stem that is headed in a countersunk hole in the rim of the wheel, and rivets secure the stem and tubular end together. Braces pass from the rim (between the tubular spoke ends) through between the split spokes at the base of the tubular end, which braces act to strengthen the wheel. I prefer to employ two tires with a rubber between them and to connect the parts by yielding bolts or pins.

In the drawings, Figure 1 is an elevation of a wheel complete. Fig. 2 is a vertical section of the same at $x$ $x$. Fig. 3 is a section through the rim and spoke end in large size. Fig. 4 is a section at $y$ $y$, in large size, and Fig. 5 is a section showing modification in the construction of the rim.

A represents the axle, and $a$ $a'$ the hub-flanges, connected or formed therewith, as usual.

The rim of the wheel is composed of the crescent felly or inner rim, $b$, the outer rim or tire, $c$, and rubber ring $d$ between the rims $b$ and $c$. The spokes are formed from tubes $e$ of sheet metal of any desired size, which tubes are split longitudinally for the greater part of their length into the parts or spokes $e'$ $e^2$, the ends of which are flattened at 4 and riveted to the inner opposite faces of the flanges $a$ $a'$. There are stems $f$ received and headed in countersunk holes in the rim $b$, and the outer tubular end of each spoke has within it one of the stems and secured thereto by one or more rivets, and the extreme end of the tubular spoke $e$ is to be made slightly concave to neatly fit the rim $b$.

Instead of forming the rims $b$ $c$ of crescent shape, I sometimes make them flat, as shown in the drawings, Fig. 5.

I employ braces $i$, which are connected at their flattened ends to the rim $b$ and pass between the spokes $e'$ $e^2$ at the bases or ends of the stems $f$ and at the point of intersection of the tubular end $e$ and said spokes. These braces act to materially stiffen the rim of the wheel. The flattened ends of these braces $i$ are brazed or riveted, or both, to the rim $b$, or secured in both ways, and said ends lap over one another where they are fastened.

The outer rim, $c$, is secured in place by pins or bolts K, headed upon one end and screw-threaded and having a nut at the other end, and these pins pass through the outer rim, $c$, the rubber $d$, the inner rim, $b$, the flattened ends of the braces $i$, and a washer, 5, which I prefer to place under the nuts 6. Ordinarily these pins or bolts K are strained just enough to hold the outer rim, $c$, in place; but when a weight upon the wheel causes the rubber to yield at the ground-contact the pins are relieved and pushed in slightly, but are again strained as soon as the revolution of the wheel transfers the weight and contact to another point.

My improved wheel is light, rigid, and very strong, and not liable to get out of order or become damaged.

I claim as my invention—

1. The combination, with the rim, axle, and the two separate hub-flanges $a$ $a'$, of the tubular spokes split and diverging and fastened at their inner ends to the hub-flanges, and the headed stems $f$, passing through the rim and secured within the tubular ends of the spokes, substantially as specified.

2. The combination, with the axle and hub-flanges, of a rim, $b$, and rubber $d$, stems $f$, headed to the rim $b$, tubular ends $e$, and spokes $e'$ $e^2$, split from the tubular end and passing off toward and riveted to the hub-flanges, substantially as set forth.

3. The combination, with the axle and hub-flanges and the tire $b$ and rubber $d$, of split tubular spokes $e$, stems $f$, passing into the tubular ends $e$ and the rim $b$, and having heads within the rim, the split tubular ends passing to the hub-flanges, and the braces $i$, secured to the rim $b$ and passing between the spokes $e'$ $e^2$, substantially as and for the purposes set forth.

4. The combination, with the hub-flanges, rim $b$, and split tubular spokes connecting the rim and flanges, of the rubber $d$, the rim $c$, and headed pins K, passing through the rims and rubber and having clamping-nuts 6, substantially as specified.

Signed by me this 20th day of October, 1887.

THOMAS O'BRIEN.

Witnesses:
GEO. T. PINCKNEY,
WILLIAM G. MOTT.